United States Patent [19]

Desserre

[11] Patent Number: 4,622,615
[45] Date of Patent: Nov. 11, 1986

[54] MAGNETIC TRANSDUCER FOR HIGH DENSITY RECORDING OR WRITING

[75] Inventor: Jacques Desserre, Rambouillet, France

[73] Assignee: Cii Honeywell Bull (Societe Anonyme), Paris, France

[21] Appl. No.: 626,032

[22] Filed: Jun. 29, 1984

[30] Foreign Application Priority Data

Jul. 13, 1983 [FR] France ................. 83 11728

[51] Int. Cl.[4] .............................................. G11B 5/28
[52] U.S. Cl. ................................................... 360/121
[58] Field of Search ................. 360/121, 123, 125–127

[56] References Cited

U.S. PATENT DOCUMENTS

| 3,495,230 | 2/1970 | Best | 340/174.1 |
|---|---|---|---|
| 4,012,782 | 3/1977 | Lazzari | 360/121 |
| 4,016,601 | 4/1977 | Lazzari | 360/123 |
| 4,138,702 | 2/1979 | Magnenet | 360/125 |
| 4,198,667 | 4/1980 | Lazzari et al. | 360/123 |
| 4,287,544 | 9/1981 | Lazzari | 360/131 |
| 4,317,148 | 2/1982 | Chi | 360/119 |
| 4,323,941 | 4/1982 | Lazzari et al. | 360/123 |
| 4,358,806 | 11/1982 | Arai | 360/123 |
| 4,385,334 | 5/1983 | Yanagida | 360/123 |

FOREIGN PATENT DOCUMENTS 1604401 12/1971 France .
WO82/00613 5/1982 PCT Int'l Appl. .

Primary Examiner—Robert S. Tupper
Attorney, Agent, or Firm—Kerkam, Stowell, Kondracki & Clarke

[57] ABSTRACT

A transducer for writing data on a magnetic carrier includes a magnetic circuit having a writing pole piece (PPI$_2$), realized in thin magnetic layers of anisotropic magnetic material. A conductor (CMPI) for controlling the writing is coupled magnetically with the pole piece and acts upon the pole piece for writing a datum by reversing the magnetization. A second control is magnetically coupled with the pole piece (PPI$_2$), but does not act upon the pole piece except in the case of non-writing by diminishing the effective action of the conductor control.

9 Claims, 23 Drawing Figures

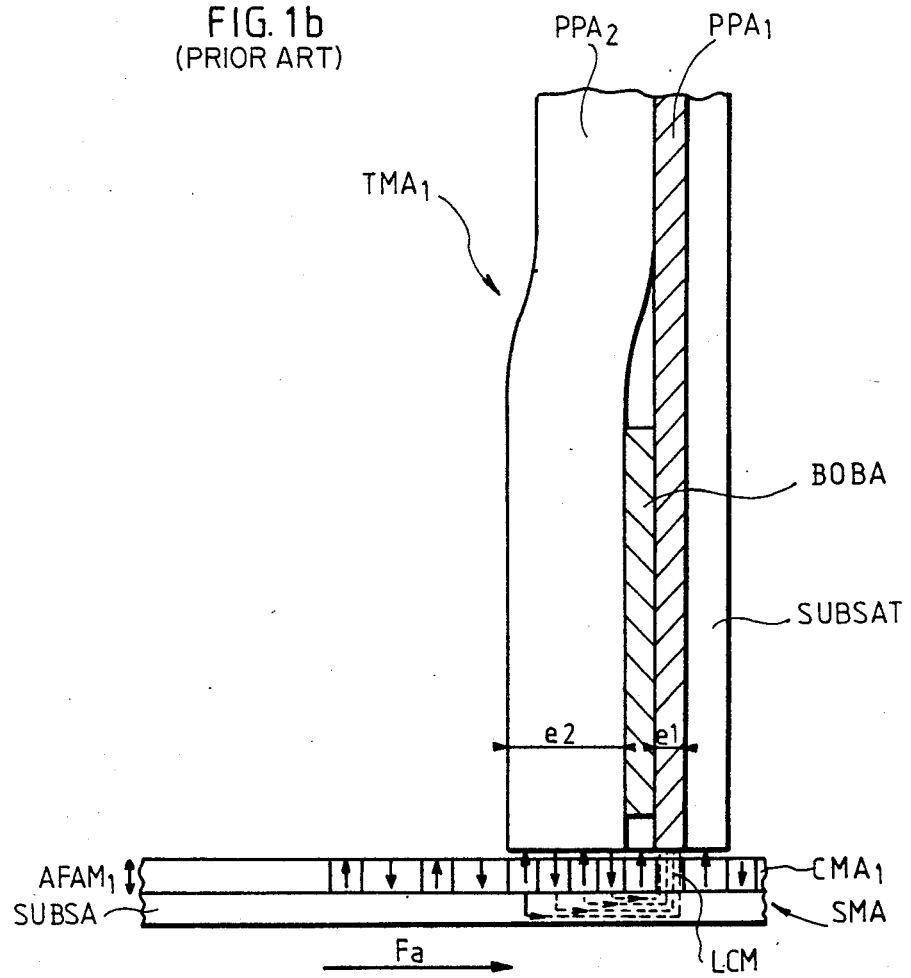

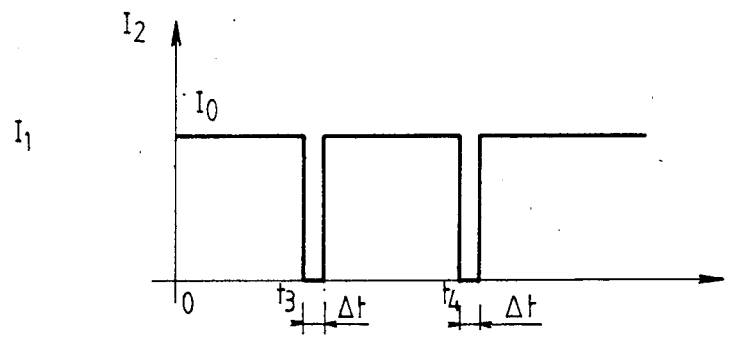
FIG. 9
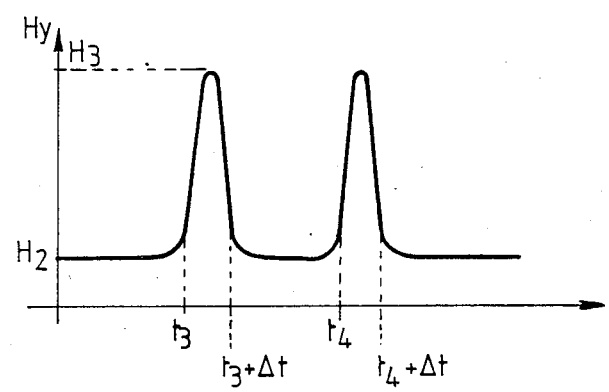
FIG. 10
FIG. 13
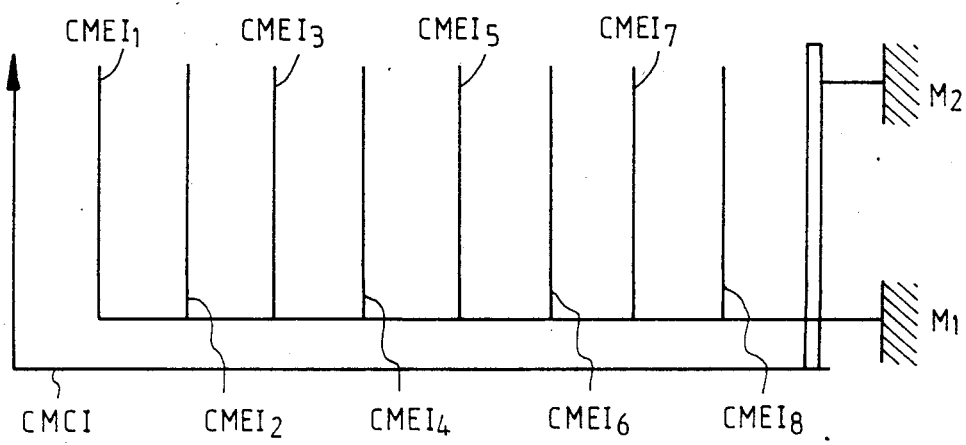

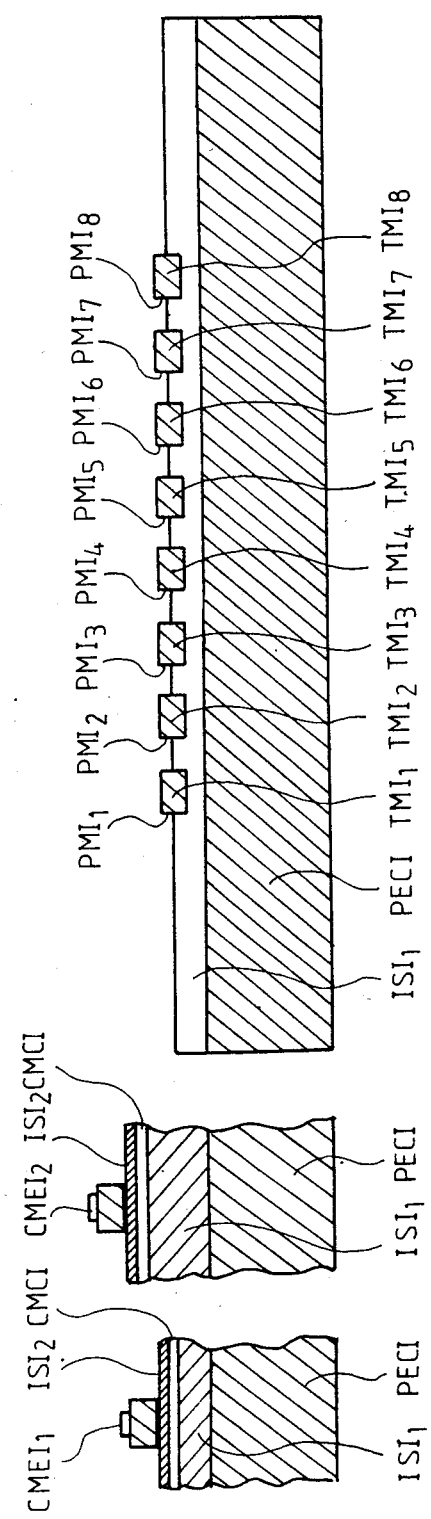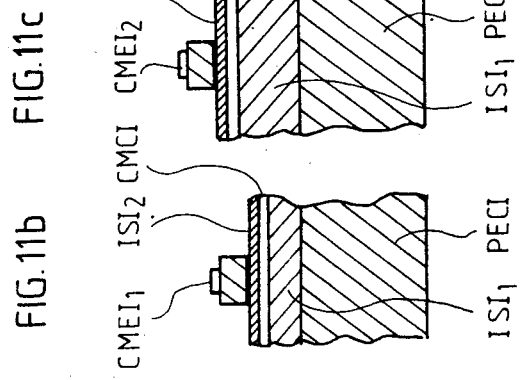

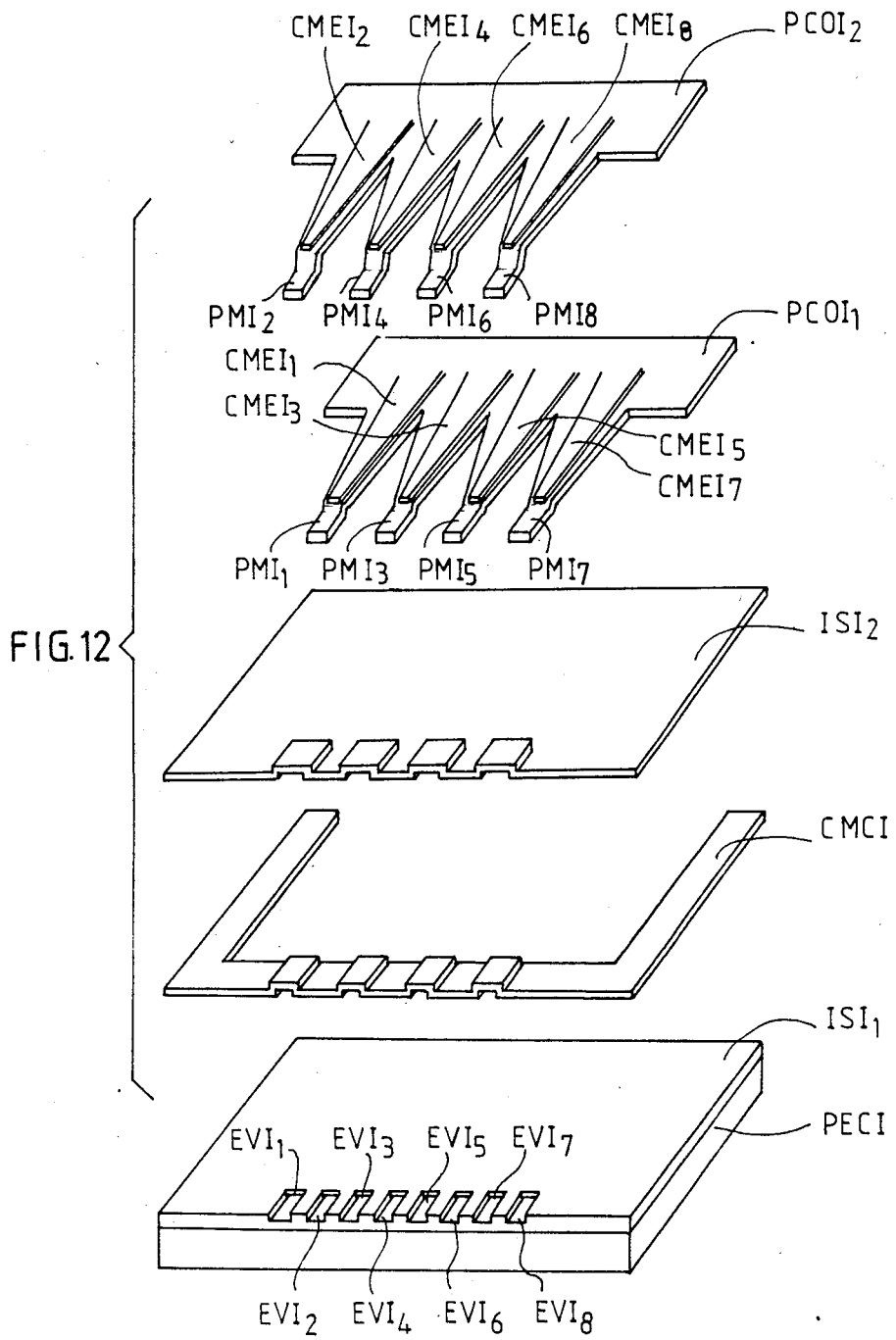

MAGNETIC TRANSDUCER FOR HIGH DENSITY RECORDING OR WRITING

BACKGROUND OF THE INVENTION

1. Field of the Invention

The present invention relates to a highly integrated magnetic transducer for recording data on a magnetic carrier. It is applicable particularly to high-density recording, in terms of linear or radial length, of data on magnetic discs in disc memories, and more particularly to recording on magnetic discs of magneto-optical memories used in data processing systems.

2. Description of the Prior Art

In magnetic disc memories, it is known for the data stored on the magnetic discs to be contained on the interior of concentric, circular magnetic recording tracks generally covering the greater part of the two faces of the disc.

A sequence of magnetic data written on one track of a disc generally takes the form of a succession of small magnetic domains, called "elementary domains", distributed over the entire length of the track and having magnetic inductions that are of the same module and face in the same directions.

The term "linear data density" is used to mean the number of changes in direction of magnetization per unit of length, measured along the circumference of a track, and the term "radial density" refers to the number of tracks per unit of length, measured along the diameter of the disc.

For the sake of simplicity, the term "transducer" is used for the means that enable either the writing (or, equally accurately, the recording) of the data on the magnetic discs or the reading of the data therefrom, or finally that enable the realization of both of these two functions. One or more transducers are generally associated with one face of a given disc, and the disc passes before the transducer or transducers as it rotates.

One recent trend in the development of magnetic disc memories is toward research into magneto-optical memories, where the data are written onto the magnetic discs by means which are most often magnetic or thermo-magnetic. Reading is effected by an assembly of opto-electronic devices which make it possible to observe one face of a disc, at a given moment and at a given site, by means of a beam of polarized light and to furnish an electrical signal, the voltage or current of which is a function of the value of the data located at that site.

In these memories, the goal is to attain radial and linear densities equal or superior to 5,000 tracks per centimeter and 10,000 changes in the direction of magnetization per centimeter, respectively.

The method of writing on recording data is thus selected for magnetic discs of magneto-optical memories is known as "perpendicular recording". In this method, the magnetization in the elementary domains is perpendicular to the magnetic recording layer of the disc. It is found that this type of magnetization makes it possible to obtain greater linear and radial data densities and that the type of observation associated with it, that is, with a beam of light, is simpler than the type of observation in a recording mode where the magnetization is longitudinal, or in other words parallel to the magnetic recording layer and to the track. In perpendicular recording, the magnetic material comprising the recording layer is an anisotropic magnetic material; that is, a material having at least one direction of privileged magnetization, also known as the "direction of easy magnetization".

In magneto-optical memories, one method of writing the data makes use of magnetic transducers generally comprising a magnetic circuit coupled to a winding and including an air gap. The variation in induction at the interior of the air gap enables the writing of the data contained on the carrier associated with this transducer.

In order to attain very high linear and radial data densities, integrated magnetic transducers are preferably used, of the type described in U.S. Pat. No. 4,287,544 of Jean-Pierre Lazzari, issued on Sept. 1, 1981 and entitled "Magnetic Data Carrier for Perpendicular Recording"; the patent is assigned to the Compagnie Internationale pour l'Informatique CII Honeywell Bull.

The integrated magnetic transducer includes two pole pieces realized in thin magnetic layers and disposed on the same side of the data carrier, forming an air gap in the vicinity thereof. The pole pieces enclose an electrical winding formed of thin conducting layers superimposed on one another and separated from one another by thin insulating layers. The transducer rotates before the carrier perpendicular to the plane of the two thin magnetic layers comprising the pole pieces. Upon this rotation, every magnetic domain of one track of the carrier facing which the transducer is disposed passes in succession over time to face the first pole piece, called the "upstream pole piece", and the second pole piece, called the "downstream pole piece". Preferably, if the width of the pole pieces is considered to be the dimension thereof measured parallel to the direction of rotation, then the width of the upstream pole piece is substantially greater than that of the downstream pole piece (generally by more than a factor of 5).

Writing data on the carrier is accomplished by causing the carrier to rotate at a given constant speed and by causing a variable current which is representative of the data to be written to pass through the winding. This current, which passes through all the conducting layers of the winding, causes a magnetic flux to be generated in the pole pieces which closes across the magnetic layer of the data carrier. The magnetic flux is concentrated opposite the downstream pole piece because the width of this pole piece is so small. As the axis of easy magnetization of the magnetic layer is perpendicular to the surface of the magnetic recording layer, the component of the magnetic field perpendicular to this surface has an intensity sufficient to cause the reversal of the magnetization in this direction. Opposite the upstream pole piece, by contrast, the magnetic field disperses, and its component perpendicular to the surface of the layer has an intensity which is much less than the same component opposite the downstream pole piece. This makes it possible not to modify the magnetic state of the layer at the level of the upstream pole piece and enables the downstream pole piece to write the data under the most advantageous conditions.

The pole pieces are preferably realized in an anisotropic magnetic material, the axis of easy magnetization of which is perpendicular to the direction in which the data rotate and parallel to the surface of the carrier, and the axis of difficult magnetization is perpendicular to the data carrier. The advantages of using anisotropic pole pieces are set forth particularly clearly in U.S. Pat. No. 3,723,665, also of Jean-Pierre Lazzari, and assigned to the Compagnie Internationale pour l'Informatique and the Commissariat à l'Energie Atomique, issued on Mar. 27, 1973 and entitled "Integrated Magnetic Head Having Alternate Conducting and Insulating Layers Within an Open Loop of Two Magnetic Films".

With a view to attaining radial and linear densities on the order of those indicated above, it is necessary for the dimensions of the downstream pole piece to be such that at the level of the plane of the air gap, the section of this pole piece has a length and width on the order of several tenths of a micron. In this case, this same downstream pole piece is embodied with a shape that has a frontal constriction at the level of the air gap, for example in the manner described in U.S. Pat. No. 4,016,601, assigned to the Compagnie Internationale pour l'Informatique and entitled "Integrated Magnetic Head Having Pole-Pieces of a Reduced Frontal Width", issued on Apr. 5, 1977. The pole piece may equally well have a trapezoidal shape. In other words, this means that at the level of the air gap, the section of the downstream pole piece is much slighter in width than in the parts of this pole piece that are more remote from the recording carrier. In order to reduce the dimensions of the integrated transducer, it may be provided that no more than a limited number of conductors, indeed only a single conductor, be used, above all in the case of the writing of data.

The present trend in developing magneto-optical memories is toward attempting to write simultaneously on a plurality of tracks (8 tracks, for example), the eight-bit bytes of information being distributed for instance over eight adjacent tracks, in order to increase the rate at which the writing is performed and thereby reducing the time required for writing on one face of a disc. As a result, there is a need to realize an assembly of magnetic transducers of very small dimension, known as large scale integrated transducers, this assembly being known by the term "multi-transducer heads".

Multi-transducer heads are known, being described for instance in U.S. Pat. No. 4,198,667, issued on Apr. 15, 1980 and assigned to the Compagnie International pour l'Informatique CII Honeywell Bull, entitled "Magnetic Head Platform Incorporating at Least One Integrated Transducer". This type of head includes an assembly of transducers identical to those described in U.S. Pat. Nos. 4,016,601 and 4,287,544 mentioned above, disposed side by side in such a manner as to enable writing (or reading) data on a plurality of tracks simultaneously.

Other multi-transducer heads are also known. One such is described, for instance, in the article in "IEEE Transactions of Magnetics", Vol. MAG 18, No. 6, November 1982, on page 1140 by Wakapayashi, Abe and Miyairi. Each of the transducers of the multi-transducer heads mentioned herein includes a first conductor, called the "pre-polarization" conductor, which is common to all the transducers, and a second conductor in the form of a loop which is proper to each transducer and parallel to the first conductor. This second conductor is a selection conductor enabling the control of writing by the selected transducer for writing a given datum at a given instant on one track of the recording carrier.

The first, pre-polarization conductor imparts to each of the pole pieces of each of the transducers a magnetic state called the pre-polarization state, such that the magnetic field created in the immediate vicinity of the air gap is insufficient for writing a datum on the portion of the carrier located facing this air gap at this instant, yet it is sufficient for limiting the energy to be furnished to the selection conductor during the writing process.

For writing a datum on the carrier by means of a given conductor, a current pulse is provided in the second conductor of this transducer which tends to create in the pole pieces of this transducer a supplementary polarization, called "super-polarization", which being added to the prepolarization brought about by the passage of the current within the first conductor enables the transducer to create a magnetic field in the vicinity of its air gap, the intensity of which suffices for writing a datum on the part of the carrier located facing this air gap. The advantage of such a provision is a reduction in the intensity of the writing current in the winding, and particularly in the first conductor, which makes it possible to reduce the heating up of the heads and to reduce the number of turns of each winding, which is an advantage with respect to the multi-transducer heads mentioned above and described in U.S. Pat. No. 4,198,667, also mentioned above. Conversely, however, these heads have the disadvantage of having transducers the dimensions of which are such (essentially because of the loops embodying the second conductors) that the spacing between the different transducers (that is, the dimensions between the axes of symmetry of the air gaps normal to the carrier, and parallel to the direction of rotation of the carrier) is greater than the spacing between the tracks on which writing is to be performed (this spacing being roughly equal to the distance between the axes of symmetry of the tracks), so that it becomes extremely complicated and time-consuming to write all the data on a disc.

Furthermore, the shape and dimension of the windings are such that the risks of interaction between the magnetic fields created by the windings of adjacent transducers are not merely negligible; there is the threat of crosstalk occurring between adjacent transducers.

SUMMARY OF THE INVENTION

The present invention makes it possible to overcome these disadvantages and relates to a multi-transducer head where the spacing between the transducers is equal to that between the tracks on which writing is to be performed. For each of these transducers, the characteristics listed above and defined by U.S. Pat. Nos. 4,287,544, 4,016,601 and 3,723,665 are used. According to the invention, a mode of operation based directly on the anisotropy of the pole pieces and more particularly in the downstream pole piece compels the magnetization to be oriented in a direction proximate to the direction of easy magnetization (the latter being parallel to the recording carrier) in the case of non-writing, and in a direction more remote from this direction in the case where writing is to be performed.

This is attained in accordance with the invention by providing each of the transducers with a first conductor perpendicular to the axis of difficult magnetization of the pole pieces and a second conductor perpendicular to the axis of easy magnetization of the same pole pieces, with the first conductor being disposed between the pole pieces and the second conductor being disposed on the downstream pole piece such that this downstream pole piece is disposed between the first and the second conductor. In this manner, it can be said that the first and second conductors are perpendicular to each other.

Thus a transducer according to the invention, which is part of a multi-transducer head, functions in the following manner:

When the first and the second conductors experience the currents $I_1$ and $I_2$, respectively, passing through them, the direction of magnetization within the downstream pole piece is contiguous with the direction of easy magnetization. The magnetic field created by the transducer in the magnetic recording layer of the carrier does not then have an intensity sufficient to write a datum on this carrier.

Conversely, if the current through the second conductor is suppressed (this conductor is perpendicular to the axis of easy magnetization), the direction of the magnetization in the downstream pole piece is more remote from the direction of easy magnetization than in the preceding instance. The magnetic field created in the recording layer of the carrier then has an intensity sufficient for writing a datum on the part of the carrier which at that instant is located facing the downstream pole piece.

In other words, the writing of a datum is attained by suppressing the passage of current through the second conductor, while non-writing is attained by providing for the flow of current through this same conductor, which blocks the functioning of the transducer. This mode of operation is accordingly contrary to that conventionally used, in particular in the transducers described in the "IEEE Transactions of Magnetics" article referred to above, where writing is attained by furnishing the energy complementary to the energy of pre-polarization by sending current through the selection conductor.

The two conductors of the transducer according to the invention may be said to be of the "crossed action" or "contrary action" type.

According to the invention, the large scale integrated (LSI) magnetic transducer for writing magnetic data on a carrier rotating before it, which comprises magnetic circuit having a writing pole piece;

first writing control means acting upon the writing pole piece such that in the immediate vicinity of the carrier this pole piece produces a magnetic field of an intensity sufficient to write the data on the carrier; and chacterized in that it includes second control means acting upon the writing pole piece, in the case of non-writing, by the diminution of the action of the first means upon the writing pole piece in such a manner that the magnetic field produced by the writing pole piece then has an intensity insufficient for writing data on the carrier.

In a preferred embodiment of the transducer according to the invention, the magnetic circuit includes another pole piece, disposed with the writing pole piece on the same side of the recording carrier and in the vicinity thereof forming an air gap, and at least the writing pole piece, which is the downstream pole piece, is realized as a thin and magnetically anisotropic layer with its directions of difficult and easy magnetization, respectively, being normal and parallel to the carrier; the first control means are embodied by the means for generating a magnetic field along the direction of difficult magnetization of the downstream pole piece.

This preferred embodiment of the transducer according to the invention is characterized in that the second control means are embodied by the means for generating a magnetic field along the direction of easy magnetization of the down stream pole piece.

In a particular embodiment of the above transducer according to the invention, in which the two pole pieces are embodied as thin layers and the first means are embodied by a first conductor disposed perpendicular to the direction of difficult magnetization and magnetically coupled to the magnetic circuit, the second means comprise a second conductor disposed perpendicular to the direction of easy magnetization.

Preferably, the first conductor is disposed between the first and second pole pieces, and the second conductor is disposed on the second pole piece in such a manner that the first and second conductors are disposed perpendicular to one another on either side of the second pole piece.

The invention also relates to a multi-transducer reading head including plurality of transducers identical to those described in the two previous paragraphs. It is characterized in that the first pole piece is common to all the transducers and is embodied by a single piece, that the first conductor is common to all the transducers, that each of the transducers has its own second pole piece and its own second conductor, and that the second pole pieces are disposed such that their extremities contiguous with the plane of the air gap are co-planar with and equidistant from one another.

BRIEF DESCRIPTION OF THE DRAWINGS

Further features and advantages of the invention will become more apparent from the ensuing detailed description, which is given by way of non-limiting example, taken in conjunction with the drawings.

FIG. 1 shows an integrated magnetic transducer for writing data according to the prior art as described in U.S. Pat. No. 4,287,544 mentioned above. comprising FIG. 1a and 1b wherein FIG. 1a is a three-quarters perspective view and FIG. 1b is a sectional side view, taken in a plane normal to the magnetic recording carrier and parallel to the direction of rotation of the carrier;

FIG. 4 shows one exemplary embodiment of the large scale integrated (LSI) magnetic transducer according to the invention comprising FIGS. 4a, 4b and 4c, wherein

FIG. 7 shows how the direction of the magnetization vector is determined in the interior of the downstream pole piece, from the characteristic magnetic curve of the magnetic material comprising this pole piece, a characteristic curve known as an astroid curve;

FIG. 8 shows the characteristic magnetic curve, known as an astroid curve, of the magnetic recording carrier, to facilitate comprehension of the manner in which data are recorded onto this carrier;

FIG. 9 is a partial timing diagram of the current circulating in the second conductor of the transducer according to the invention;

FIG. 10 shows the progression of the magnetic field created by the transducer according to the invention in the immediate vicinity of the air gap as a function of time and accordingly as a function of the current circulating in the second conductor, the curve of this current being shown in FIG. 9;

FIG. 11 shows a multi-transducer head according to the invention and comprises FIGS. 11a, 11b, 11c and 11d.

FIG. 11b is a sectional view of this head, the plane of the section being a plane normal to the head and parallel to the recording carrier and passing through the first conductor, and showing an even-numbered transducer;

FIG. 11c is a sectional view of the head according to the invention, taken in a sectional plane perpendicular to the head and parallel to the recording carrier, passing through the first conductor and showing an odd-numbered transducer;

FIG. 11d is a bottom view as seen from the magnetic recording carrier;

FIG. 12 shows the various essential constituent elements of the multi-transducer head according to the invention and shown in FIG. 11, seen in perspective; and FIG. 13 is a skeleton diagram showing the electric control circuit of the various transducers comprising the multi-transducer head shown in FIG. 11.

DESCRIPTION OF THE PREFERRED EMBODIMENTS

In order to better comprehend the principles underlying the structure and function both of the large scale integrated (LSI) magnetic writing transducer according to the invention and of the multi-transducer head according to the invention, it will be useful to recall the principles underlying the structure and function of the integrated magnetic writing transducers and the multi-transducer heads according to the prior art. These principles are illustrated by FIGS. 1a, 1b and 2, which show an integrated magnetic writing transducer according to the prior art, and by FIG. 3, which shows a multi-transducer head according to the prior art.

Figure 1A:
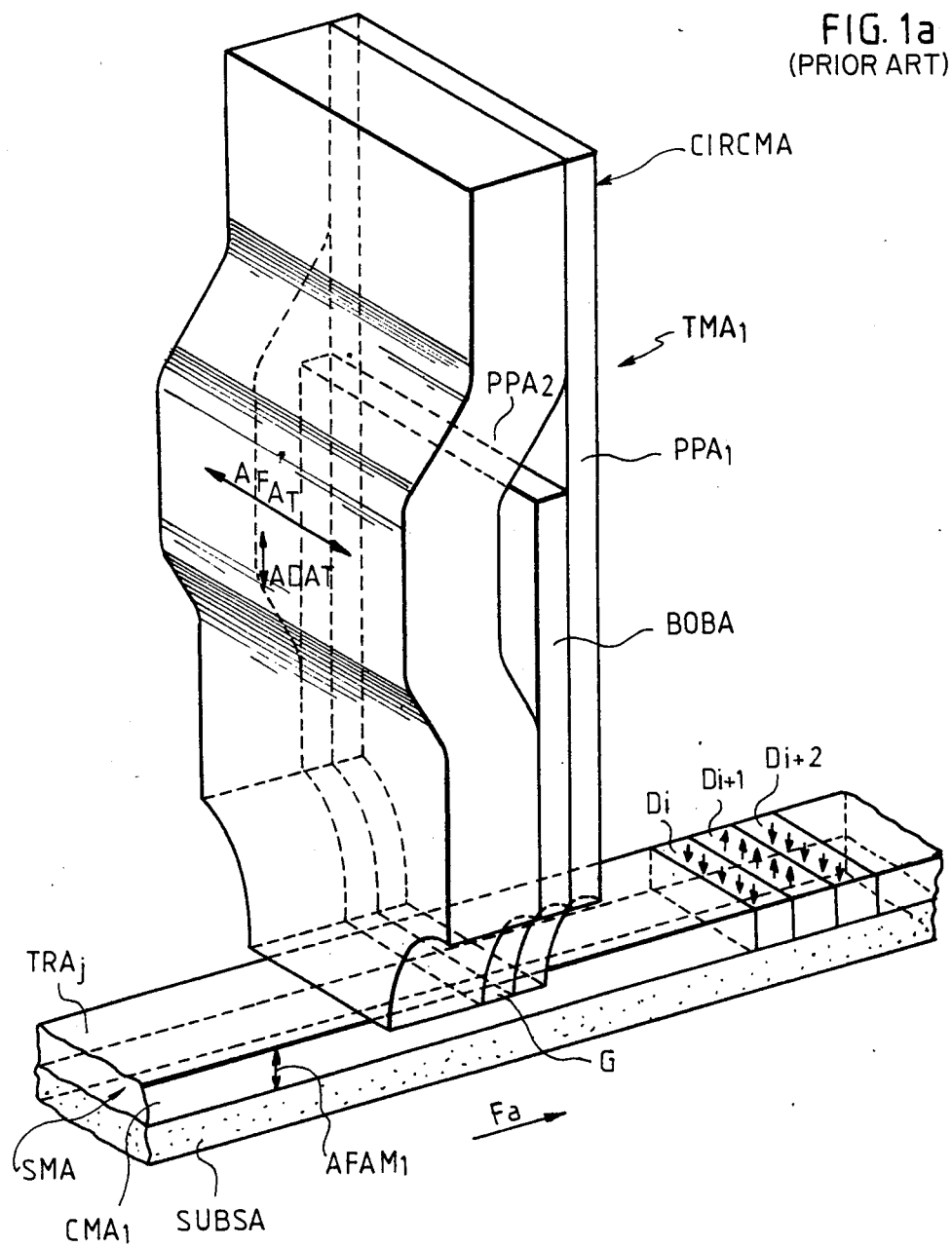
Figure 2:
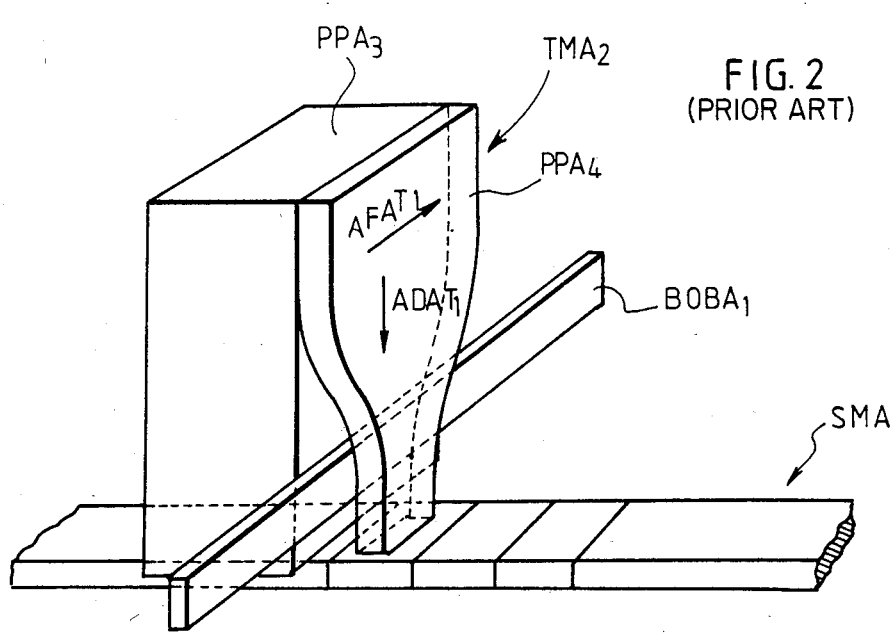
FIG. 2 shows a variant embodiment of the transducer of FIG. 1, realized according to the principles described in U.S. Pat. No. 4,016,601 mentioned above.

FIGS. 1a and 1b are intended to show an integrated magnetic writing transducer such as is described in U.S. Pat. No. 4,287,544, mentioned above.

This transducer, identified as $TMA_1$, includes:
a first pole piece $PPA_1$;
a second pole piece $PPA_2$; and
a winding BOBA.

The two pole pieces $PPA_1$ and $PPA_2$ are disposed on the same side of the information carrier SMA and in the vicinity thereof having the air gap G, the longer dimension of which is shown here perpendicular to the direction of travel of the data indicated by the arrow Fa. The two pole pieces, which make up the magnetic circuit CIRCMA, are formed by a plurality of thin layers separated from one another by thin insulating layers, these various layers not being shown in FIG. 1a or FIG. 1b for the sake of simplification. The pole piece $PPA_1$ is disposed on a nonmagnetic insulating substrate SUBSAT (shown only in FIG. 1b and not shown in FIG. 1a for the sake of clarity in FIG. 1a). The winding BOBA is formed of a succession of thin conductive layers and thin insulating layers superimposed on one another and enclosed by the two pole pieces $PPA_1$ and $PPA_2$.

The pole piece $PPA_1$ preferably has a thickness (a dimension measured along a direction parallel to the direction of travel Fa) $e_1$ which is much less than the thickness $e_2$ of the pole piece $PPA_2$.

The pole pieces $PPA_1$ and $PPA_2$ are quite often realized in anisotropic magnetic material. The axis of easy magnetization of the pole pieces is the axis AFAT, parallel to the recording carrier SMA (and perpendicular to the direction of travel Fa of the data). The axis of difficult magnetization is the axis ADAT normal to the plane of the magnetic recording carrier SMA.

The recording carrier SMA, which is disposed facing the air gap of the transducer $TMA_1$, is made up of a layer $CMA_1$ of magnetic anisotropic material disposed on a substrate SUBSA. The axis of easy magnetization of this magnetic and anisotropic material is marked $AFAM_1$. It is oriented perpendicularly to the surface of the layer (see FIGS. 1a and 1b).

To write the data on a track $TRA_j$ of the carrier SMA, which is rotating in the direction indicated by the arrow Fa at a given, constant speed, a current representative of the data to be written, formed by a sequence of positive and negative pulses of variable duration, is sent through the winding BOBA. It will be understood that the magnetic field applied to the pole pieces by the passage of this current through the winding has an important component along the direction of difficult magnetization of the pole pieces. It can thus be said that the winding BOBA comprises an assembly of means for generating a magnetic field along the direction of difficult magnetization of the pole pieces and in particular of the downstream pole piece.

This magnetic field causes a magnetic flux to be generated across the pole pieces $PPA_1$ and $PPA_2$, which closes across the magnetic layer $CMA_1$ and the substrate SUBSA in the manner indicated in FIG. 1b by the lines of magnetic flux LCM. Facing the pole piece $PPA_2$, the magnetic field has an intensity which is much weaker than facing the pole piece $PPA_1$, considering that the magnetic flux circulating in the assembly comprising the two pole pieces $PPA_1$ and $PPA_2$, the magnetic layer $CMA_1$ and the substrate SUBSA is assumed to be conserved and that the thickness $e_2$ is greater than the thickness $e_1$.

It is thus apparent that the downstream pole piece $PPA_1$ writes the data on the magnetic recording carrier SMA, without this operation of writing the data being interfered with by the upstream pole piece $PPA_2$. This downstream pole piece is also known as the writing pole piece.

FIG. 2 shows a variant embodiment $TMA_2$ of the magnetic transducer $TMA_1$, more particularly intended for writing data at very high density, both radially and linearly, on a recording carrier SMA such as a magnetic disc.

This transducer $TMA_2$ includes:

an upstream pole piece $PPA_3$, also known as the "thick pole";

a downstream pole piece $PPA_4$, also known as the "thin pole" or the writing pole piece; and a winding $BOBA_1$, preferably formed by a reduced number of conductors, even by a single conductor, as is shown in FIG. 2. This single conductor is disposed such that between the two poles $PPA_3$ and $PPA_4$ it is perpendicular to the axis of difficult magnetization $ADAT_1$ of the transducer, the axis of easy magnetization of this transducer $TMA_2$ being marked $AFAT_1$. The winding $BOBA_1$ comprises an assembly of means for generating a magnetic field along the direction of difficult magnetization of the downstream pole piece.

It can be seen that the thin pole piece $PPA_4$ has a slender shape and has a reduced width at the level of the air gap; in section, this reduced width has dimensions on the order of a micron, thereby allowing it to write the data with the desired radial and linear density. The transducer of FIG. 2 is inspired by the characteristics utilized in the above-cited U.S. Pat. No. 4,016,601.

Figure 3:
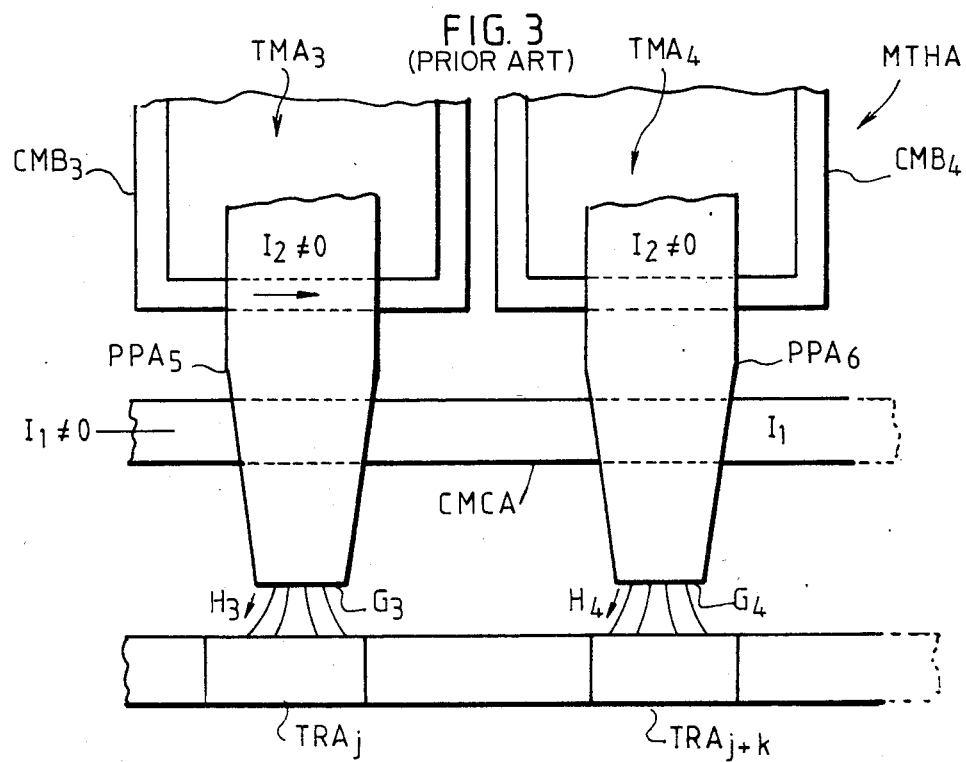
FIG. 3 is a partial view illustrating the principle underlying the realization and function of a multi-transducer recording head according to the prior art as described in the article from "IEEE Transactions of Magnetics" cited above.

As has been noted above, if one wishes to increase the rate at which data are written in disc memories, such as magneto-optical memories, one is led to the realizing of multi-transducer heads including a plurality of transducers of the type shown in FIG. 2. A head of this type as found in the prior art is shown in a partial view in FIG. 3. This head is identified as MTHA. In FIG. 3, only two transducers $TMA_3$ and $TMA_4$ are shown schmetically, but it is clear that this head MTHA may advantageously contain additional transducers. The two transducers $TMA_3$ and $TMA_4$ are presented in FIG. 3 by their thin poles, or writing pole pieces, $PPA_5$ and $PPA_6$, the thick poles not being shown in order to simplify the drawing.

The multi-transducer head MTHA of FIG. 3 may preferably be realized in the manner described in the article in "IEEE Transactions of Magnetics" cited above. It then includes a first winding formed by the thin conductor CMCA, which is common to the two transducers $TMA_3$ and $TMA_4$. The transducer $TMA_3$ includes a second thin conductor in the form of the loop $CMB_3$, and the transducer $TMA_4$ includes a thin conductor in the form of the loop $CMB_4$, which is identical in form to $CMB_3$. In particular, these two conductors, between the thick poles and the thin poles, are parallel to the comon thin conductor CMCA, as can be seen in this same FIG. 3.

The functioning of the multi-transducer head MTHA is as follows. A constant current $I_1$ passes through the common conductor MCA. When one wishes to write data on the track TRAj, for instance by means of the transducer $TMA_3$, a current $I_2$, in the same direction as $I_1$, is sent through the thin conductor in the form of the loop $CMB_3$, creating in the vicinity of the air gap $G_3$ of the transducer a field $H_3$ which suffices to write a datum on the track TRAj. Similarly, if one wishes to write a datum on the trak TRAj+k, where k is an integer, a current $I_2$ of the same direction as $I_1$ is sent through the thin conductor in the form of the loop $CMB_4$, creating a field $H_4$ at the level of the air gap $G_4$ of the transducer $TMA_4$ the intensity of which suffices to write a datum on the track TRAj+k. It is clear that when the current $I_2$ circulating in the conductors $CMB_3$ and $CMB_4$ is zero, the intensity of the fields $H_3$ and $H_4$ created by the passage of the current $I_1$ through the common conductor CMCA has an intensity which is insufficient to write a datum on either the track TRAj or the track TRAj+k.

It is thus understood that, for the transducer $TMA_3$, the conductor CMCA and the conductor $CMB_3$, form "means for generating a magnetic field along the direction of difficult magnetization of the downstream pole piece $PPA_5$". For the transducer $TMA_4$, these means are constituted by the conductor CMCA and the conductor $CMB_4$.

In conclusion, it is equally correct to define these elements of FIGS. 1-3, for any of the transducers $TMA_1$, $TMA_2$, $TMA_3$, $TMA_4$, as means for acting upon the pole piece (downstream pole piece) and controlling writing such that in the immediate vicinity of the carrier these means produce a magnetic field of intensity sufficient for writing the data thereon.

As has been said above, one of the major disadvantages of these multi-transducer heads is, because of the intrinsic fact of the presence of the conductors in the form of loops $CMB_3$ and $CMB_4$ and the relatively large bulk of the transducers $TMA_3$ and $TMA_4$, it is practically speaking, impossible to write simultaneously on two adjacent tracks. Thus it will be understood that the track TRAJ+k may be spaced apart from the track TRAj by a distance equal to several tracks, and thus K>1.

Figure 4A:
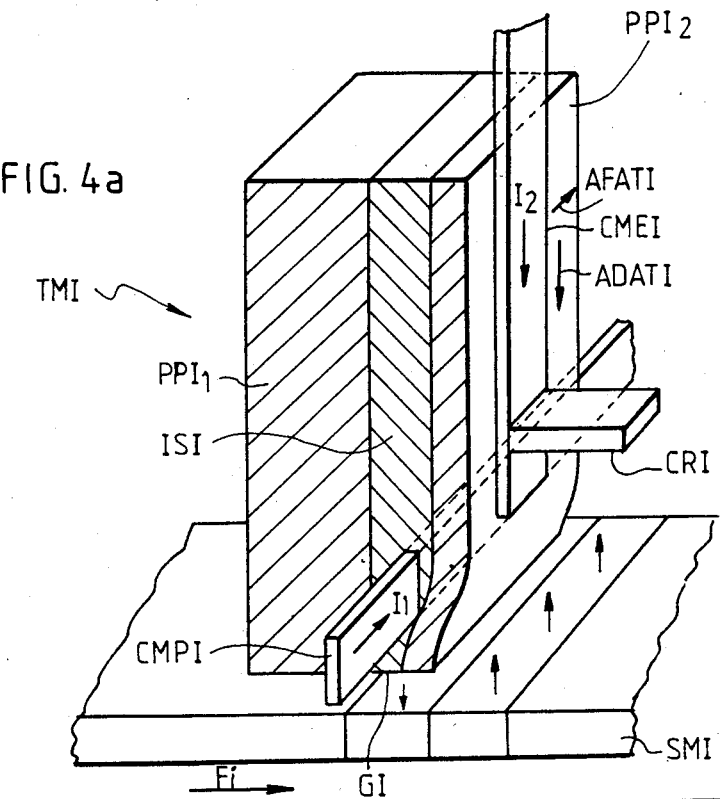
FIG. 4a is a three-quarters perspective view showing the transducer disposed facing a recording track of the magnetic carrier.
Figure 4B:
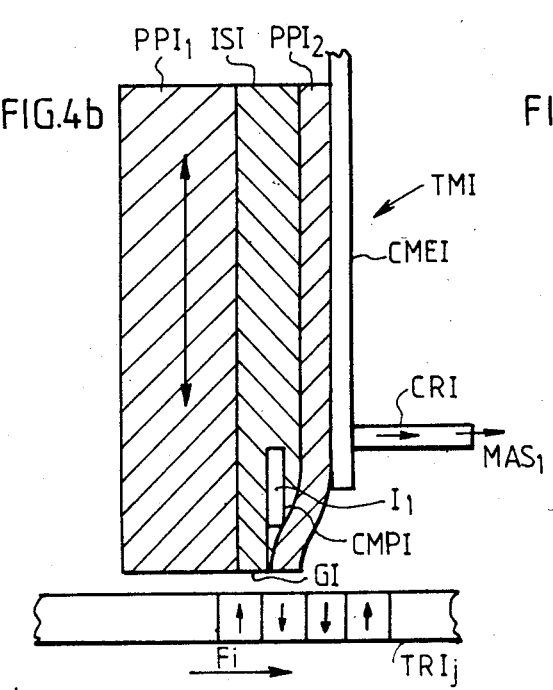
FIG. 4b is a section view taken in a plane normal to the data carrier and parallel to the direction in which the data rotate.

The structure and the function of the transducer according to the invention, which is identified as TMI and shown in FIGS. 4a and 4b, are such that they make it possible to design multi-transducer heads which overcome the above-addressed disadvantages. Furthermore, this transducer has an extremely simple and efficient manner of functioning.

Figure 4C:
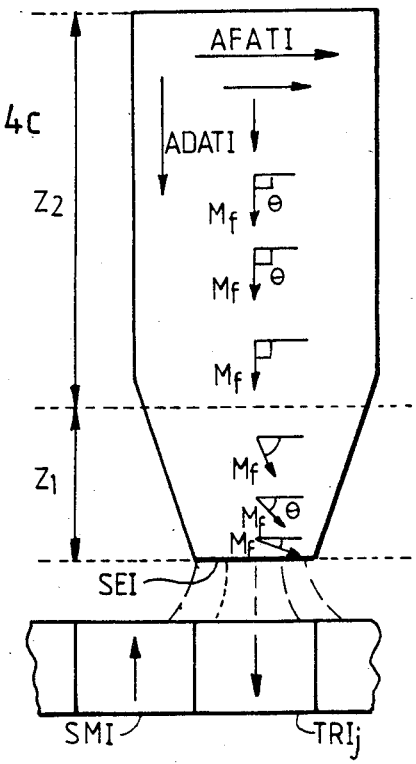
FIG. 4c shows the angle formed by the magnetization vector within the downstream pole piece with the direction of easy magnetization at several points in this piece.

As shown by FIGS. 4a, 4b and 4c, the transducer TMI according to the invention includes:

a thick pole $PPI_1$;

a pole $PPI_2$ comprising the downstream pole piece or the downstream writing pole piece;

a thin principal conductor CMPI disposed between the poles $PPI_1$ and $PPI_2$ and embedded in an electrical insulator ISI;

a second conductor for the control of writing, indentified as CMEI, disposed on the thin pole $PPI_2$ in such a manner that the thin pole is located between the two conductors CMPI and CMEI. It will be understood that an electrical insulating layer separates the conductor CMEI from the thin pole $PPI_2$, although for the sake of simplification of FIGS. 4a and 4b this layer is not shown. The conductor CMEI is associated with a return conductor CRI which allows the current to return toward a mass $MAS_1$. The thin pole $PPI_2$ is realized in magnetic anisotropic material, which is preferably true of the thick pole $PPI_1$ as well.

The thin principal conductor CMPI is perpendicular to the axis of difficult magnetization ADATI of the pole pieces $PPI_1$ and $PPI_2$, whereas the conductor CMEI is perpendicular to their axis of easy magnetization AFATI. As a result the magnetic field created by the passage of a current $I_1$ through the conductor CMPI will be parallel to the axis of difficult magnetization ADATI, while the magnetic field created by the passage of a current $I_2$ through the conductor CMEI creates a magnetic field parallel to the axis of easy magnetization AFATI.

It may thus be said that the transducer TMI includes:

first means for generating a magnetic field along the direction of difficult magnetization of the downstream pole piece, namely the thin principal conductor CMPI; and second means for generating a magnetic field along the direction of easy magnetization of the downstream pole piece, namely the second conductor CMEI.

In FIGS. 4a, 4b, and 4c, the transducer TMI is shown disposed above a track TRIJ of a magnetic recording carrier SMI having an axis of easy magnetization identical to the carrier SMA and which is for example a magnetic disc. The disc rotates in the direction of the arrow $F_i$.

FIG. 4c will now be described, which shows the function of the transducer according to the invention.

At rest (zero currents $I_1$ and $I_2$), that is, without the application of an external magnetic field, the magnetization (defined as the density of magnetic moments per unit of volume $\delta m/\delta v$) orients itself spontaneously along the direction of easy magnetization AFATI (magnetization vector MR in FIG. 4c), where m is the magnetic moment at each point of the downstream pole piece. If when adjusting the intensity of the currents $I_1$ and $I_2$ an external magnetic field having a component along the direction of difficult magnetization which is not zero is applied to the magnetic anisotropic material of the downstream pole piece PPI$_2$, the magnetization (vector $M_f$) in FIG. 4c orients itself along a direction that makes an angle $\theta$ with the axis of easy magnetization AFATI.

At every point of the downstream pole piece, the value of $\theta$ is given by the following system of equations:

$\delta\epsilon/\delta\theta = 0$ (condition of a minimum of energy)

$\delta^2\epsilon/\delta\theta^2 \geq 0$ (condition of stability of equilibrium), $\epsilon$ being the energy at this point.

To write a datum on the carrier SMI with the downstream pole piece PPI$_2$, one therefore attempts to produce an external field of sufficient intensity to orient the magnetization $M_f$ along a direction as close as possible to the axis of difficult magnetization, with an average value of $\theta$ in the vicinity of 90° (although near the edges of the pole piece and in particular of the surface of the air gap SEI, $\theta$ is little different from zero by reason of the existence of demagnetizing fields on the edges). Two zones are observed, a zone $Z_2$ where $\theta$ is approximately equal to 90° (except in the vicinity of the edges) and a zone $Z_1$ where $\theta$ is different from 90°.

This is obtained for $I_1 \neq 0$ and $I_2$ as close as possible to zero, the intensity of the current $I_1$ being of course selected such that the average value of $\theta$ is as close as possible to 90° and the intensity of the magnetic field created by the writing pole piece in the vicinity of the carrier, which is normal thereto and parallel to the axis of easy magnetization AFATI, is sufficient for writing the data on the carrier.

If the intensity of the current $I_2$ is acted upon such that the magnetic field applied to the pole piece has a component that is not zero along the direction of easy magnetization AFATI, then $\theta$ decreases (at every point of the pole piece): thus the magnetization $M_f$ can be said to approach the axis of easy magnetization. Under these conditions, the writing field (that is, the field created by the downstream pole piece in the immediate vicinity of the air gap) decreases until it becomes insufficient for writing a datum on the carier, for a predetermined value for $I_2$.

Figure 5A:
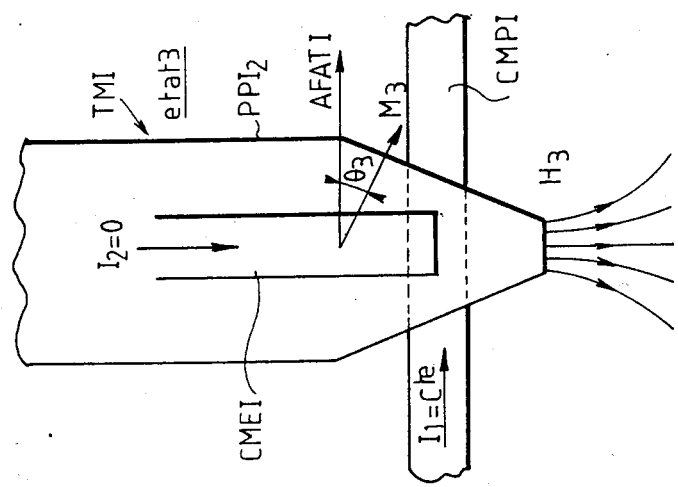
FIG. 5 comprises FIGS. 5a, 5b and 5c which illustrate, as a function of the current circulating through the first and second conductors, the direction of the magnetization vector on the inside of the downstream pole piece of the transducer according to the invention.
Figure 5B:
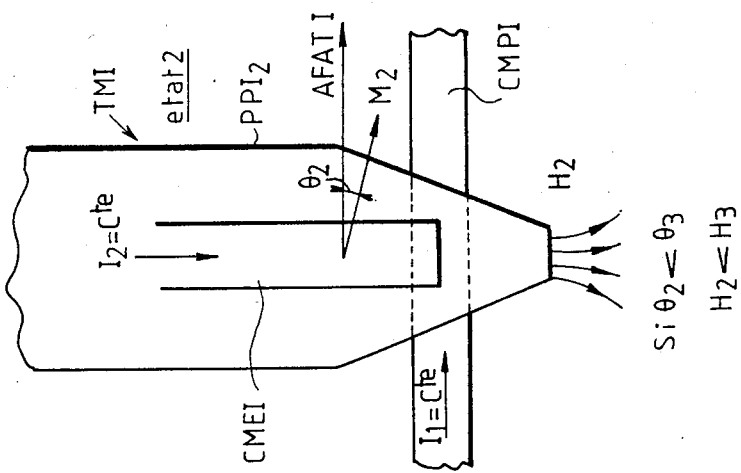
Figure 5C:
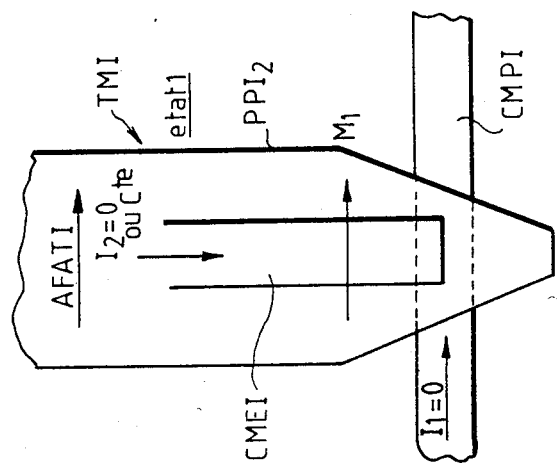

Given the manner of functioning described above, the transducer TMI has three functional states, illustrated by FIGS. 5a–5c.

In these FIGS. 5a–5c, the transducer TMI is represented symbolically by the thin pole PPI$_2$, the conductor CMEI and the conductor CMPI.

Figure 7:
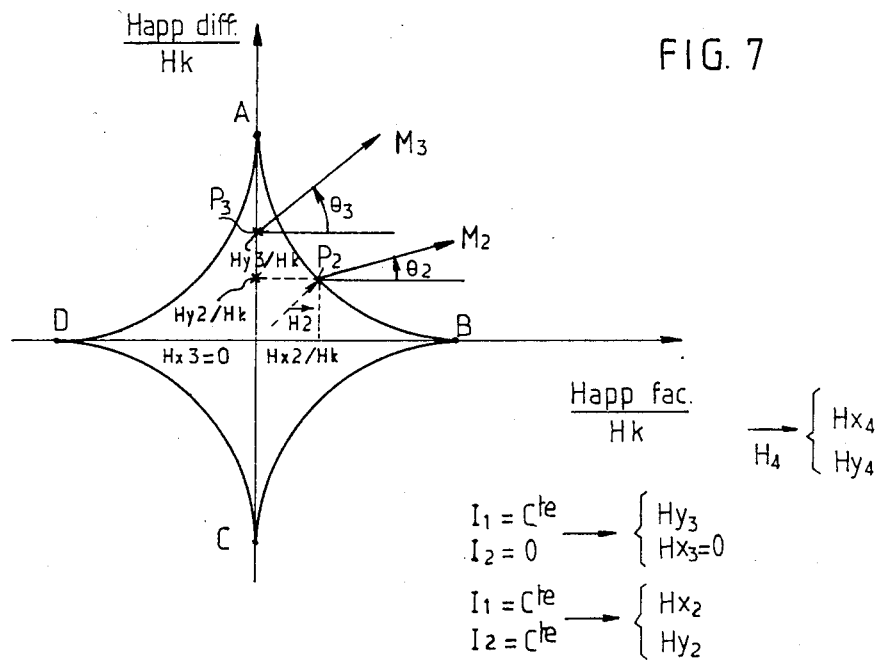
FIGS. 7 and 8 illustrate different steps in the function of the transducer according to the invention and shown in FIG. 4.

These three functional states are as follows:

First state, $E_1$ (FIG. 5a): The current $I_1$ is zero and the current $I_2$ is either zero or has some arbitrary value. Under these conditions, the magnetization on the interior of the thin pole PPI$_2$, represented by the vector $M_1$, has a direction parallel to the axis of easy magnetization AFATI (it will be appreciated that if $I_2$ has an arbitrary value, it creates a magnetic field parallel to the axis of easy magnetization which reinforces the orientation of the magnetization on the interior of the thin pole parallel to the axis of easy magnetization AFATI);

Second state, $E_2$ (FIG. 5b): A constant current $I_1$ is passed through the conductor CMPI and a constant current $I_2$ is passed through the conductor CMEI. In the thin pole PPI$_2$, the magnetization takes the direction of the vector $M_2$. This latter vector forms an angle $\theta_2$ with the direction of easy magnetization AFATI. This angle $\theta_2$ is determined in the manner shown in FIG. 7, which shows a characteristic curve of the magnetic anisotropic material comprising the pole PPI$_2$, a curve of the type called "astroid". Let it be recalled that this curve is obtained in the following manner: On the ordinate, the value of the ratio between the magnetic field applied along the direction of the difficult axis and the field of anisotropy Hk of the material (remembering that the field of anisotropy Hk is the value of the magnetic field H applied in the direction of difficult magnetization for which the material is saturated in this direction) is plotted. On the abscissa is plotted the value of the ratio between the magnetic field applied in the direction of easy magnetization of the material and the same field of anisotropy Hk. Let A, B, C, D indicate the vertices of the astroid, A and C being the vertices placed on the axis of the ordinates and B and D being the vertices placed on the axis of the abscissas. If H×2 is the magnetic field created by the passage of current $I_2$ along the direction of the axis of easy magnetization and Hy2 is the magnetic field created by the passage of the current $I_1$ through the conductor CMPI, along the direction of the axis of difficult magnetization, then a functional point P$_2$ is obtained having as its abscissa the ratio H×2/Hk and as its ordinate the ratio Hy2/Hk. The tangent to the astroid taken from the point P$_2$ yields the direction of the magnetization vector $M_2$ with respect to the axis of easy magnetization, this direction being defined by the angle $\theta_2$. The astroid and the manner in which the angle $\theta$ is obtained are discussed in greater detail in the book by Landau and Lifschitz entitled "Electrodynamique des milieux continus" (*Electrodynamics of Continuous Media*), Moscow edition, section 37, p. 199 ff.

A magnetic field H$_2$ in the vicinity of the thin pole PPI$_2$ of the transducer TMI corresponds to the vector of magnetization $M_2$.

Third state, $E_3$ (FIG. 5c): A current $I_1$, which is preferably constant, is passed through the conductor CMPI, the current $I_2$ through the conductor CMEI being zero. The magnetization in the thin pole PPI$_2$ is given by the magnetization vector $M_3$ which forms an angle $\theta_3$ with the direction of easy magnetization AFATI, this angle $\theta_3$ being obtained in the manner shown in FIG. 7: The functional point P of the transducer is defined by its abscissa equal to zero and by its ordinate equal to Hy3/Hk. The direction of the magnetization vector $M_3$ is given by the straight line tangent to the astroid which thus forms an angle $\theta_3$ with the parallel to the axis of easy magnetization taken at the point $P_3$. It is clearly shown in FIGS. 7, 5b and 5c that the angle $\theta_3$ is larger than the angle $\theta_2$. Under these conditions, it is demonstrated that the magnetic field $H_3$ created by the transducer TMI in the immediate vicinity of the thin pole $PPI_2$ is greater than the field $H_2$.

Corresponding to the various states defined by FIGS. 5a, 5b and 5c, respectively, are three steps in the process of writing data on the magnetic recording carrier SMI, these three steps being respectively designated as $PH_1$, $PH_2$ and $PH_3$.

These three steps may be defined in the following manner:

(a) Step $PH_1$ (FIG. 6a): Let it be supposed that the magnetic recording carrier SMI is in a magnetic state such that its magnetization is uniform and defined, for example, by the direction indicated by the arrows contained in the various domains $D_1-D_7$ in FIG. 6a. This uniform magnetization is obtained for example by means of an erasing transducer TREF of a known type disposed upstream of the upstream pole piece $PPI_1$. It is a matter of course that this magnetization is parallel to the axis of easy magnetization AFAMI of the recording carrier SMI. If by convention it is supposed that the positive magnetizations are those oriented from top to bottom in FIGS. 6a–6c, then in FIG. 6a the magnetization is positive in the domains $D_1-D_7$.

It is a matter of course that if the currents $I_1$ and $I_2$ are zero, the magnetic state of the thin pole $PPI_2$ of the transducer TMI being defined by FIG. 5a, then the recording carrier SMI does not at any point undergo a change in the direction of magnetization and no datum whatever is written upon the carrier SMI.

(b) Step $PH_2$ (FIG. 6b) ($I_1$ and $I_2 \neq 0$): The magnetic state of the thin pole $PPI_2$ is defined by FIG. 5b, the magnetic field in the immediate vicinity of this pole being $H_2$. The intensity of this field is not sufficient to bring about any change in the direction of magnetization on the carrier SMI. As a result, in step $PH_2$ no datum whatever is written on the track $TRI_j$ of the recording carrier SMI.

(c) Step $PH_3$ (FIG. 6c): This step corresponds to the magnetic state $E_3$ defined by FIG. 5c ($I_1 \neq 0$, $I_2 \neq 0$). The intensity $H_3$ of the magnetic field created by the transducer TMI in the immediate vicinity of the pole piece $PPI_2$ is sufficient to cause a change in direction of magnetization in the magnetic domain, here $D_6$, which is located facing the thin pole $PPI_2$ at the instant when the current $I_2$ becomes zero, or in other words at the instant $t_3$ (see FIG. 9). In order to make the magnetization in domain $D_6$ fluctuate, it is sufficient for the period during which the current $I_2$ is zero to be extremely short, symbolized by $\Delta t$ in FIG. 9. If $I_2$ is zero, it may equally well be said that the second means (conductor CMEI) are in a state of rest.

Figure 6C:
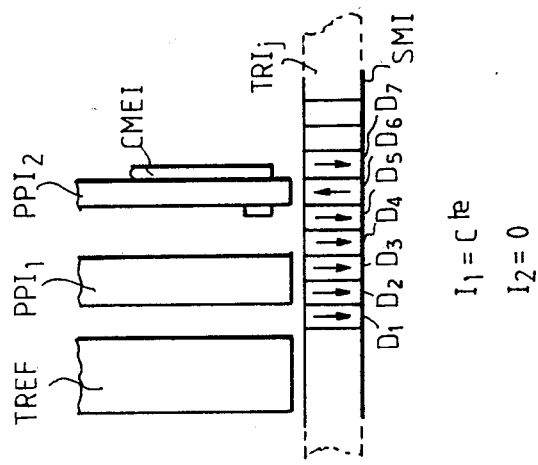
FIG. 6 comprises FIGS. 6a, 6b and 6c which show how the data are written onto the magnetic recording carrier as a function of the direction occupied by the magnetization vector in the downstream pole piece as indicated by FIGS. 5a, 5b and 5c.
Figure 6B:
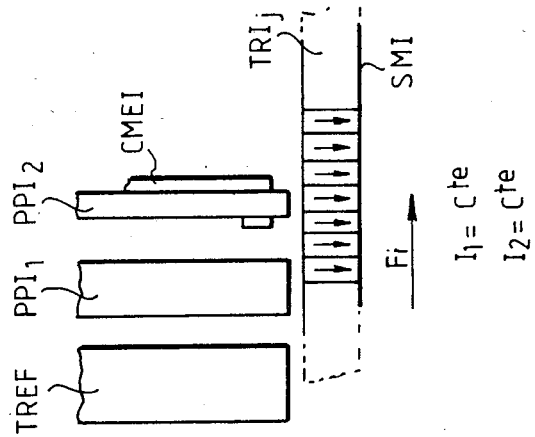
Figure 6A:
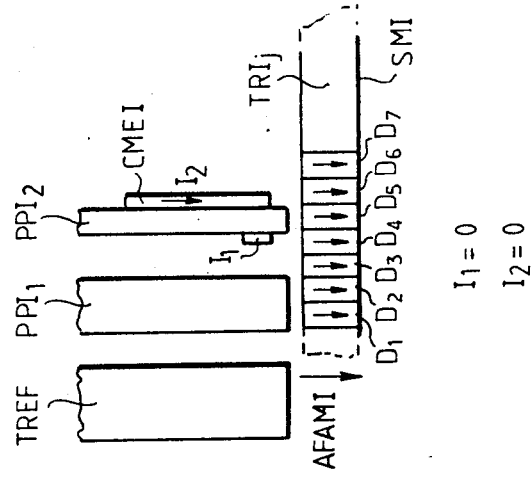
Figure 8:
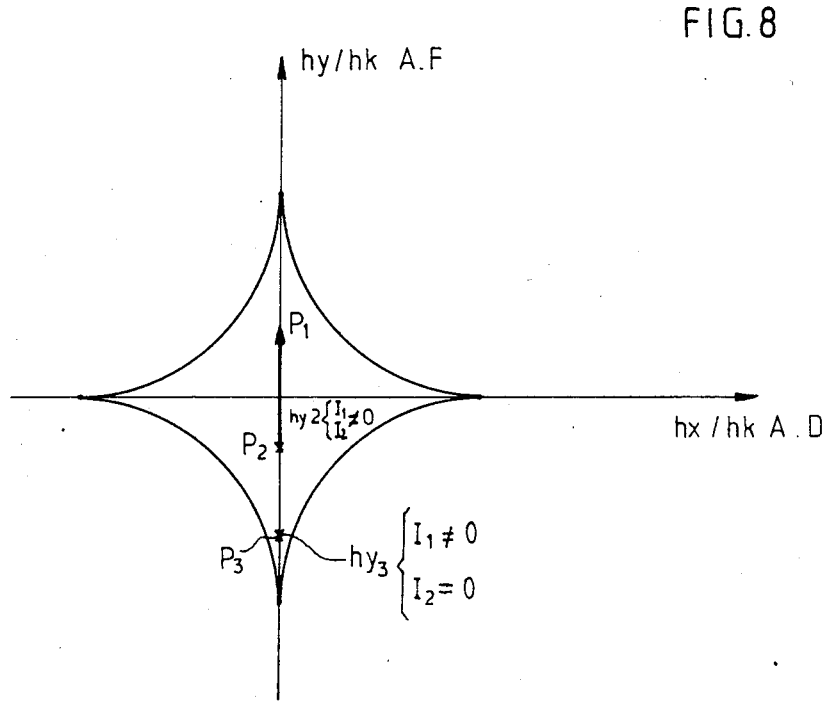

Corresponding to each of the steps in the process of writing defined by FIGS. 6a, 6b and 6c are magnetic states of the magnetic recording carrier SMI defined in FIG. 8, where the astroid of the recording carrier SMI is shown. This astroid yields the curve of the variation of hy/hk as a function of hx/hk. hy is the value of the magnetic field in the recording carrier along the direction of the axis of easy magnetization AFATI; hx is the value of the magnetic field in the recording carrier SMI along the axis of difficult magnetization perpendicular to the axis of easy magnetization AFAMI and parallel to the surface of the carrier; and hk is the field of anisotropy of the anisotropic magnetic material comprising the recording carrier SMI.

Corresponding to step $PH_1$ is the functional point $P_1$.

Corresponding to step $PH_2$ is the functional point $P_2$, the value of the magnetic field applied along the axis of easy magnetization, by reason of the presence of the field $H_2$ in the vicinity of the pole $PPI_2$, not being sufficient to make the magnetizations in the carrier SMI fluctuate.

Corresponding to step $PH_3$ is the functional point $P_3$, where the value of the magnetic field hy3 applied to the interior of the carrier, as a function of the magnetic field $H_3$ produced by the transducer TMI in the immediate vicinity of the pole $PPI_2$, is sufficient to cause the magnetization inside the domain $D_6$, for example, to fluctuate.

Referring now to FIG. 9, it is shown that the current $I_2$ has the value indicated in this drawing figure; that is, it is constant and equal to $I_0$, for example being positive between times 0 and $t_3$, zero between times $t_3$ and $t_3 + \Delta t$, again constant and positive between times $t_3 + \Delta t$ and $t_4$, again zero between times $t_4$ and $t_4 + \Delta t$ (where the magnetization inside a different domain is made to fluctuate, this latter domain not being shown in FIG. 6c), and so forth.

FIG. 10, corresponding to FIG. 9, shows the variation of the field Hy produced by the pole $PPI_2$ of the transducer TMI in the immediate vicinity thereof. As seen in the drawing, this field varies between a value $H_2$ between times 0 and $t_3$ and a value $H_3$ between times $t_3$ and $t_3 + \Delta t$. The field Hy is again equal to $H_2$ between times $t_3 + \Delta t$ and $t_4$, and again equal to $H_3$ between times $t_4$ and $t_4 + \Delta t$.

In conclusion, it is shown that to write a datum on the carrier SMI, it is sufficient to suppress the current circulating in the conductor CMEI. It may thus be said that the two conductors CMPI and CMEI are contrary-action conductors, since the passage of the current through CMEI blocks writing, whereas the suppression of this current permits it.

It may equally well be said that:

the thin principal conductor CMPI comprises first writing control means acting upon the writing pole piece $PPI_2$ in such a manner that this pole piece produces, in the immediate vicinity of the carrier, a magnetic field the intensity of which is sufficient to write the data onto the carrier;

the conductor CMEI comprises second control means acting upon the writing pole piece $PPI_2$ in the case of non-writing, by diminishing the action of the first means (conductor CMPI) in such a manner that the magnetic field produced by the writing pole piece has an intensity which is insufficient for writing data on the carrier.

Referring now to FIGS. 11 and 12, which show a multi-transducer head according to the invention MTHI comprising a plurality of transducers (8, in the exemplary embodiment shown in these drawings), one finds the transducers $TMI_1-TMI_8$, the structure and functional principles of which are strictly analogous to those of the transducer TMI shown in FIGS. 4a and 4b.

All these transducers have one common thick pole PECI.

The thin poles of the transducers $TMI_1-TMI_8$ are designated $PMI_1-PMI_8$, respectively.

These thin poles are separated from the common thick pole PECI by a first insulating layer $ISI_1$.

Figure 11A:
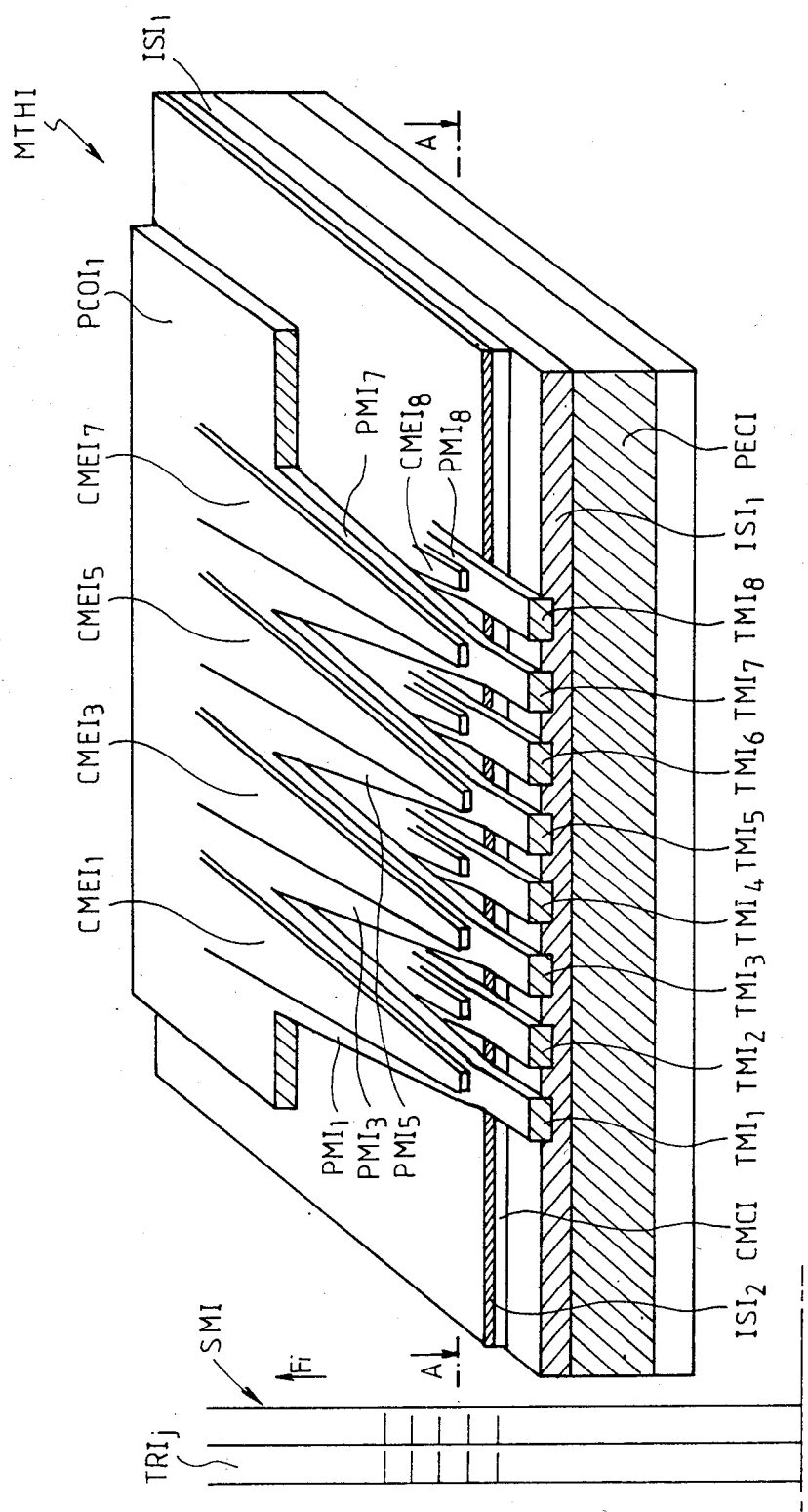
FIG. 11a is a three-quarters perspective view showing the disposition of the head with respect to a recording carrier such as a magnetic disc rotating before it.

For the sake of simplification, the odd-numbered thin poles, namely $PMI_1$, $PMI_3$, $PMI_5$ and $PMI_7$ are not shown in FIG. 11a. The even-numbered thin poles, namely $PMI_2$, $PMI_4$, $PMI_6$ and $PMI_8$, are shown only partially, in terms of their extremities in the vicinity of the air gap.

The head MTHI includes a conductor CMCI common to all the transducers $TMI_1$–$TMI_8$, this common conductor playing the role of the conductor CMPI of the transducer TMI according to the invention and as shown in FIGS. 4a and 4b.

A second insulating layer $ISI_2$ is disposed between this common conductor CMCI and the thin poles $PMI_1$–$PMI_8$.

Each of the transducers $TMI_1$–$TMI_8$ includes a thin writing conductor. These conductors are respectively designated as $CMEI_1$–$CMEI_8$. These conductors are disposed on their respective thin poles $PMI_1$–$PMI_8$ in such a manner that these thin poles are located between these writing conductors and the common conductor CMCI.

It can be seen, for instance from FIG. 11a and from FIG. 12, that the odd-numbered thin poles $PMI_1$–$PMI_7$ have shoulders, at the level of the common conductor CMCI, which are less substantial than those of the even-numbered thin poles $PMI_2$–$PMI_8$, because of the shape of the common conductor CMCI, shown greater detail in FIG. 12. This can also be seen by referring to FIGS. 11b and 11c, which are sectional views taken along the line A through the transducers $TMI_1$ and $TMI_2$.

For reasons having to do with the practical realization of the even-numbered and odd-numbered poles, because of the respective dimensions and shapes they must necessarily have (as shown, for example, in FIGS. 4a, 4b, 11a and 12), it is easier if the set of odd-numbered poles and the set of even-numbered poles are realized in the form of two physically distinct sets, with the majority of one set being disposed above the other.

As shown in the drawing, all the odd-numbered poles and all the even-numbered poles issue from their own common part, respectively $PCOI_1$ for the odd-numbered poles and $PCOI_2$ for the even-numbered poles.

The set of even-numbered poles is located above the set of odd-numbered poles (compare FIGS. 11b and 11c in terms of the respective positions of $PMI_2$ and $PMI_1$), with the exception of the extremities of the poles which are closest to the carrier SMI, at the level of the air gap. These extremities of all the poles, whether odd- or even-numbered, adjacent to the plane of the air gap are coplanar with and equidistant from one another, the spacing between the poles being equal to that between the tracks on the carrier.

It is seen particularly from FIG. 12 that the insulating layer $ISI_1$ includes recesses $EVI_1$–$EVI_8$, intended for receiving the extremities of the thin poles $PMI_1$–$PMI_8$.

FIG. 13 will now be described.

The simplified electrical layout for the control of the various transducers $TMI_1$–$TMI_8$ of the platform MTHI is extremely simple: The common conductor CMCI is connected to a mass $M_1$, while the set of eight conductors for writing control $CMEI_1$–$CMEI_8$ is connected to the same mass $M_2$.

The function of the circuit is as follows: If it is desired to write a given datum on the carrier SMI which is rotating in the direction of the arrow Fi in front of the head MTHI (see FIG. 11a), by means of one or more transducers of this head, for example transducers $TM_2$ and $TM_5$, then the current through the conductors $CMEI_2$ and $CMEI_5$ is canceled in the manner shown in FIG. 9. It is understood that in the other conductors, namely $CMEI_1$, $CMEI_3$, $CMEI_4$ and $CMEI_6$–$CMEI_8$, the current remains constant and is equal for example to the positive value I0 (see also FIG. 9).

Thus the multi-transducer head according to the invention makes it possible to write eight data bits on eight adjacent tracks of the recording carrier SMI simultaneously, without there being interference among the various transducers. In other words, the problem of crosstalk among the various transducers is eliminated, thanks to the invention. This is the consequence particularly of the fact that the magnetic fields created by adjacent transducers among each other are of the same algebraic sign, meaning that the lines of the magnetic field of one transducer cannot tend to be deviated toward the lines of the magnetic field of the transducer adjacent to it.

While the invention has been described in connection with particular embodiments, variations of these embodiments will be readily apparent to those skilled in the art from a reading of the foregoing description, and reference should be made to the appended claims which define the full scope and true spirit of the invention.

What is claimed is:

1. An integrated multi-head transducer for reading and writing data on tracks of a multi-track magnetic carrier moving past the multi-head transducer comprising a plurality of transducers, one for each track, each transducer comprising a first pole piece which is shared in common with all transducers of said plurality and a second pole piece, the first and second pole pieces being disposed adjacent to one side of the magnetic carrier with an air gap between extremities of the pole pieces and the magnetic carrier, the second pole piece being realized as a thin magnetically anisotropic layer having directions of difficult magnetization and easy magnetization respectively oriented normal and parallel to the magnetic carrier; first control means for generating a magnetic field parallel to the direction of difficult magnetization of the second pole pieces; and second control means disposed on each second pole piece for generating another magnetic field parallel to the direction of easy magnetization of the second pole piece; and wherein the second pole pieces of the plurality of transducers comprise first and second distinct sets of second pole pieces, a majority portion of the first and second sets being located in corresponding first and second spaced parallel planes, and the extremities of the second pole pieces of the first and second sets being formed such that the extremities of all second pole pieces are colinear, coplanar and spaced equidistant from one another with a spacing corresponding to the spacing between tracks on the magnetic carrier.

2. A multi-head transducer according to claim 1, wherein the first and second sets of second pole pieces are located relative to one another such that the extremities of the second pole pieces adjacent to the magnetic carrier alternate between the first and second sets.

3. An integrated multi-head transducer according to claim 2, wherein the first control means comprises a flat conductor having a number of raised ledge portions equal to the number of second pole pieces in the second set, the raised ledge portions being spaced along the conductor in accordance with the spacing of the second pole pieces in the second set, and wherein the first and second sets of second pole pieces are positioned relative to the conductor such that the second pole pieces of the second set lie adjacent to said raised ledge portions of the conductor and the second pole pieces of the first set lie adjacent to the conductor within recesses formed between said raised ledge portions, the extremities of the second pole pieces of said first and second sets being stepped relative to said first and second planes such that said extremities are colinear and coplanar.

4. A multi-head transducer according to claim 1, wherein the magnetic field produced by the first control means has an intensity sufficient to write data on the magnetic carrier, and the other magnetic field produced by the second control means has a value selected to prevent writing of data on the magnetic carrier by the first-mentioned magnetic field.

5. A multi-head transducer according to claim 1, wherein the first control means comprises a first conductor disposed between the first and second pole pieces and substantially parallel to said first and second planes, and the second control means comprises second conductors disposed on said second pole pieces substantially perpendicular to said first conductor.

6. A multi-head transducer according to claim 1, wherein the transducer is employed in a disk memory which includes an anisotropic magnetic disk having an axis of easy magnetization normal to the surface of the disk.

7. An integrated multi-head transducer for reading and writing data on tracks of a multi-track magnetic carrier moving past the multi-head transducer comprising a plurality of transducers, one for each track, each transducer comprising first and second pole pieces disposed adjacent to one side of the magnetic carrier with an air gap between extremities of the pole pieces and the magnetic carrier, the first pole piece being common to all transducers of said plurality, and each second pole piece being realized as a thin magnetically anisotropic layer having directions of difficult magnetization and easy magnetization respectively oriented normal and parallel to the magnetic carrier; first control means for generating a magnetic field parallel to the direction of difficult magnetization of the second pole pieces and of sufficient intensity to write data on the magnetic carrier; and second control means for generating another magnetic field parallel to the direction of easy magnetization of the second pole pieces and of an intensity sufficient to prevent writing of data on the magnetic carrier, and wherein the second pole pieces of the plurality of transducers comprise first and second distinct sets of pole pieces located in corresponding first and second spaced parallel planes with the extremities of the second pole pieces of the first and second sets being formed such that they lie in a common plane parallel to said first and second planes with a spacing corresponding to the spacing of the tracks on the magnetic carrier and such that the extremities of the poles pieces of the first set alternate with the extremities of the pole pieces of the second set along said common plane.

8. A multi-head transducer according to claim 7, wherein the second pole pieces of the first and second sets comprise extending finger portions of respective first and second planar furcated members respectively located in said first and second planes, the end regions of the finger portions adjacent to the extremities of the finger portions of each member being stepped with respect to the plane of the member such that the extremities lie in said common plane.

9. A multi-head transducer according to claim 8, wherein the first control means comprises a first conductor member extending in the direction of said first and second members, and the second control means comprises a plurality of second conductor members disposed upon an extending parallel to the finger portions of said first and second members.

* * * * *

UNITED STATES PATENT AND TRADEMARK OFFICE
CERTIFICATE OF CORRECTION

PATENT NO. : 4,622,615

DATED : November 11, 1986

INVENTOR(S) : Desserre

It is certified that error appears in the above-identified patent and that said Letters Patent is hereby corrected as shown below:

Column 11, line 35, "$8^{2E}/8\theta^2$" should be --$8^2E/8\theta^2$--.
    Column 12, line 42, "Hx2" should be --H$\chi$2--.
       Line 48, "Hx2" should be --H$\chi$2--.

Column 18, 34, In claim 9, after "second" and before "members", insert --planes across the finger portions of the first and second--.

Signed and Sealed this

Seventh Day of April, 1987

Attest:

DONALD J. QUIGG

Attesting Officer      Commissioner of Patents and Trademarks